United States Patent
Hamilton, II et al.

(10) Patent No.: US 9,031,871 B2
(45) Date of Patent: May 12, 2015

(54) METHOD FOR INVENTORY GOVERNANCE IN A VIRTUAL UNIVERSE

(75) Inventors: Rick A. Hamilton, II, Charlottesville, VA (US); Jenny S. Li, Danbury, CT (US); Clifford A. Pickover, Yorktown Heights, NY (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 1477 days.

(21) Appl. No.: 12/132,752

(22) Filed: Jun. 4, 2008

(65) Prior Publication Data

US 2009/0307021 A1 Dec. 10, 2009

(51) Int. Cl.
*G06Q 10/08* (2012.01)
*G06Q 30/06* (2012.01)

(52) U.S. Cl.
CPC ..................... *G06Q 10/087* (2013.01)

(58) Field of Classification Search
None
See application file for complete search history.

(56) References Cited

U.S. PATENT DOCUMENTS

| | | | | |
|---|---|---|---|---|
| 2003/0105711 A1* | 6/2003 | O'Neil | .......................... | 705/39 |
| 2004/0266505 A1* | 12/2004 | Keam et al. | ....................... | 463/1 |
| 2005/0081043 A1* | 4/2005 | Evans et al. | ................... | 713/182 |
| 2007/0174183 A1* | 7/2007 | Jung et al. | ....................... | 705/38 |

* cited by examiner

*Primary Examiner* — Ryan Zeender
*Assistant Examiner* — Hajime Rojas
(74) *Attorney, Agent, or Firm* — Lisa Ulrich; Hoffman Warnick LLC

(57) ABSTRACT

The present invention is directed to inventory governance in a virtual universe. A method of inventory governance in a virtual universe (VU) includes: providing an inventory for a virtual universe (VU) resident; and providing means for governing at least one aspect of the inventory, the governing means comprising at least one of: an administrative interface for establishing an authorizing relationship between the VU resident and an authorizing entity; a filtering interface for administering at least one filter to the inventory; or a monitoring interface for providing capability to monitor at least one of: the VU resident or the inventory.

25 Claims, 9 Drawing Sheets

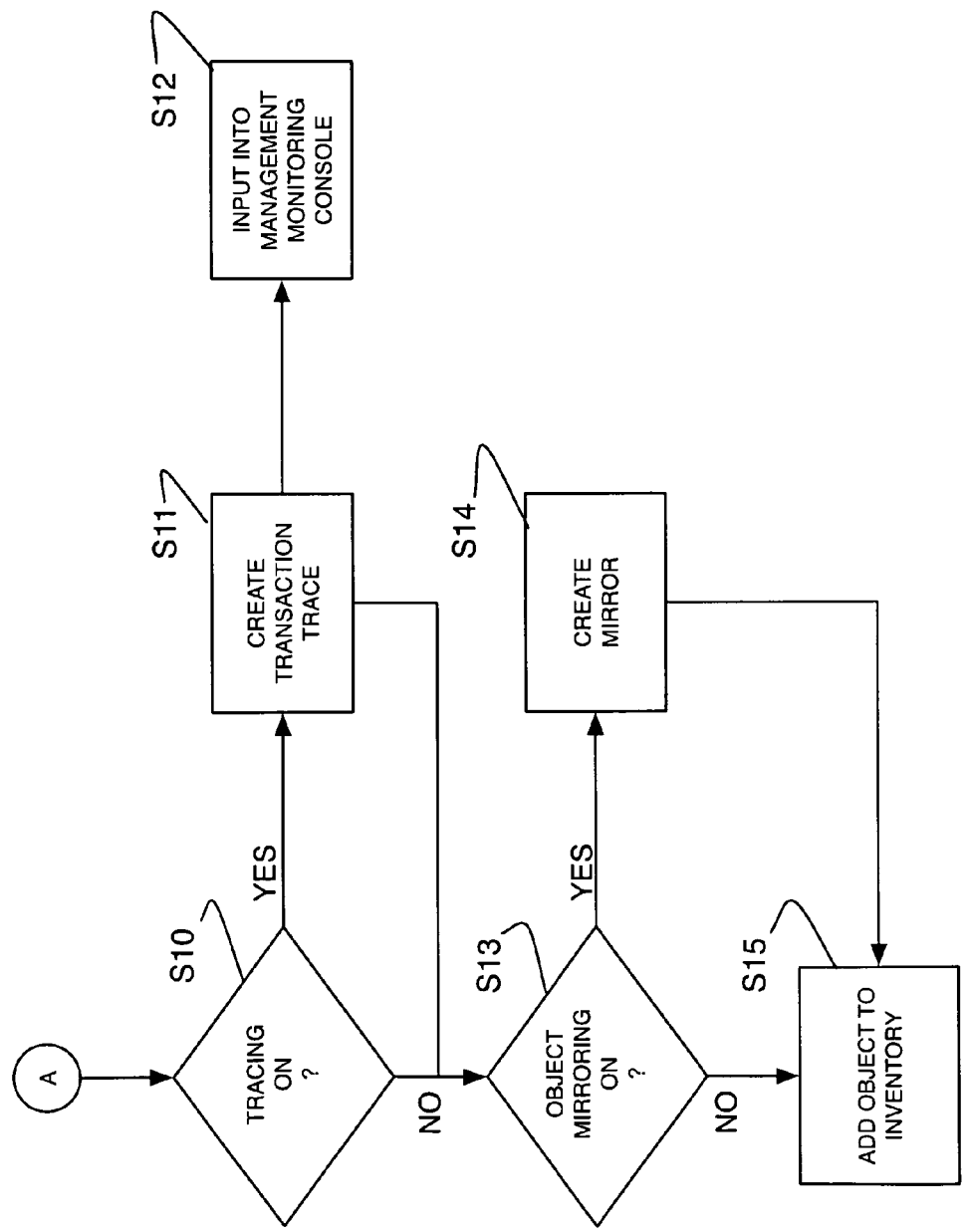

METHOD FOR INVENTORY GOVERNANCE IN A VIRTUAL UNIVERSE

FIELD OF THE INVENTION

The present invention relates generally to avatars and their inventories in a virtual universe, and more specifically relates to inventory governance in a virtual universe.

BACKGROUND OF THE INVENTION

A virtual environment is an interactive simulated environment accessed by multiple users through an online interface. Users inhabit and interact in the virtual environment via avatars, which are two or three-dimensional graphical representations of humanoids. There are many different types of virtual environments, however there are several features many virtual environments generally have in common:
A) Shared Space: the world allows many users to participate at once.
B) Graphical User Interface: the environment depicts space visually, ranging in style from 2D "cartoon" imagery to more immersive 3D environments.
C) Immediacy: interaction takes place in real time.
D) Interactivity: the environment allows users to alter, develop, build, or submit customized content.
E) Persistence: the environment's existence continues regardless of whether individual users are logged in.
F) Socialization/Community: the environment allows and encourages the formation of social groups such as teams, guilds, clubs, cliques, housemates, neighborhoods, etc.

An avatar can have a wide range of business and social experiences. Such business and social experiences are becoming more common and increasingly important in on-line virtual environments (e.g., universes, worlds, etc.), such as that provided in the on-line world Second Life (Second Life is a trademark of Linden Research in the United States, other countries, or both). The Second Life client program provides its users (referred to as residents) with tools to view, navigate, and modify the Second Life world and participate in its virtual economy.

Second Life and other on-line virtual environments present a tremendous new outlet for both structured and unstructured virtual collaboration, gaming, exploration, commerce, and travel, as well as real-life simulations in virtual spaces. As virtual environments are becoming increasingly popular for collaboration and conducting day-to-day business, avatars expect their 3D Internet experience to closely replicate that which customers have come to expect and appreciate in the physical world.

Avatars, or residents, of a virtual universe use inventories to store their belongings. The inventory may function as a repository for items such as avatar software, either "decorative" or functional, including, for example, MP3 players, encryption/decryption software, documents, virtual clothing, decorations, building architectures, artwork, and/or the like. Items may be exchanged directly between avatars, purchased or automatically deposited into an inventory. In a typical shopping scenario, a virtual universe resident traverses a store, examines items, and makes a purchase, thereby triggering the transfer of the purchased items into the resident's inventory. Heretofore there are no controls, either self-imposed by the avatar and/or by a third party, of this inventory process.

Accordingly, there is an opportunity to improve upon the existing virtual universe experience.

SUMMARY OF THE INVENTION

The present invention is directed to providing inventory governance in a virtual universe.

A first aspect of the present invention is directed to a method of inventory governance in a virtual universe (VU), comprising: providing an inventory for a virtual universe (VU) resident; and providing means for governing at least one aspect of the inventory, the governing means comprising at least one of: an administrative interface for establishing an authorizing relationship between the VU resident and an authorizing entity; a filtering interface for administering at least one filter to the inventory; or a monitoring interface for providing capability to monitor at least one of: the VU resident or the inventory.

A second aspect of the present invention is directed to a system of inventory governance in a virtual universe (VU), comprising: an inventory for a virtual universe (VU) resident; and a means for governing at least one aspect of the inventory, the governing means comprising at least one of: an administrative interface for establishing an authorizing relationship between the VU resident and an authorizing entity; a filtering interface for administering at least one filter to the inventory; or a monitoring interface for providing capability to monitor at least one of: the VU resident or the inventory.

A third aspect of the present invention is directed to a program product stored on a computer readable medium, which when executed, provides inventory governance in a virtual universe (VU), the computer readable medium comprising program code for: providing an inventory for a virtual universe (VU) resident; and providing means for governing at least one aspect of the inventory, the governing means comprising at least one of: an administrative interface for establishing an authorizing relationship between the VU resident and an authorizing entity; a filtering interface for administering at least one filter to the inventory; or a monitoring interface for providing capability to monitor at least one of: the VU resident or the inventory.

A fourth aspect of the present invention is directed to a method for deploying an application for providing inventory governance in a virtual universe (VU), comprising: providing a computer infrastructure being operable to: provide an inventory for a virtual universe (VU) resident; and provide means for governing at least one aspect of the inventory, the governing means comprising at least one of: an administrative interface for establishing an authorizing relationship between the VU resident and an authorizing entity; a filtering interface for administering at least one filter to the inventory; or a monitoring interface for providing capability to monitor at least one of: the VU resident or the inventory.

A fifth aspect of the present invention is directed to a business method for providing inventory governance in a virtual universe, the business method comprising: managing a network that includes at least one computer system that performs the process described herein; and receiving payment based on the managing.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

FIG. 7B depicts a second portion of a method of inventory governance in a virtual universe in accordance with an embodiment of the present invention.

Figure 1:
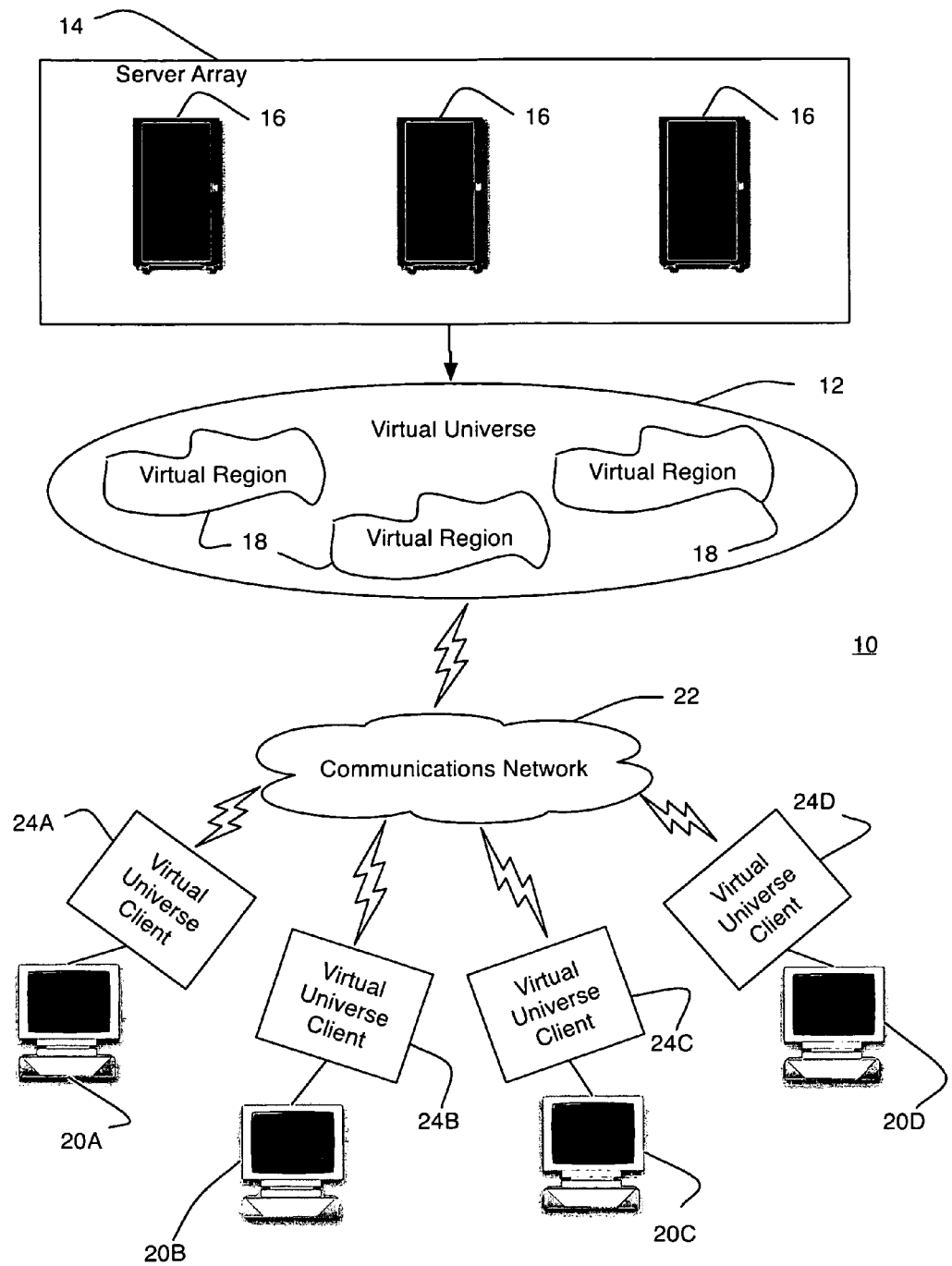
FIG. 1 depicts a high-level schematic diagram showing a networking environment for providing a virtual universe in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As detailed herein, the present invention provides inventory governance in a virtual universe. Aspects of the invention provide a method of inventory governance in a virtual universe (VU) that includes: providing an inventory for a virtual universe (VU) resident; and providing means for governing at least one aspect of the inventory, the governing means comprising at least one of: an administrative interface for establishing an authorizing relationship between the VU resident and an authorizing entity; a filtering interface for administering at least one filter to the inventory; or a monitoring interface for providing capability to monitor at least one of: the VU resident or the inventory. Aspects of the invention provide an inventory control system for a virtual universe 12 that may comprise a set of filters and/or decision control points used to determine if an item may be added to an avatar's inventory. When the avatar would like to add an item to his/her inventory, attributes may be processed through the disclosed filter(s) and/or decision point(s). If the item(s) does not pass filtering and/or decision point(s), the item is not added to the inventory or may be added in a disabled mode. Aspects of the invention provide an establishment of authorized relationships to allow setting limits in inventory; methods for creating filters and/or decision points to govern the addition of items to a member's inventory; and/or monitoring of inventory item use and rule management.

FIG. 1 shows a high-level schematic diagram showing a networking environment 10 for providing a virtual universe 12 according to one embodiment of this disclosure in which a service for providing inventory governance in a virtual universe can be utilized. As shown in FIG. 1, the networking environment 10 comprises a server array or grid 14 comprising a plurality of servers 16 each responsible for managing a portion of virtual real estate within the virtual universe 12. A virtual universe provided by a typical massive multiplayer on-line game can employ thousands of servers to manage all of the virtual real estate. The content of the virtual real estate that is managed by each of the servers 16 within the server array 14 shows up in the virtual universe 12 as a virtual region 18. Like the real-world, each virtual region 18 within the virtual universe 12 comprises a living landscape having things such as buildings, stores, clubs, sporting arenas, parks, beaches, cities and towns all created by residents of the universe that are represented by avatars. These examples of items are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe. FIG. 1 also shows that users operating computers 20 (e.g., 20A, 20B, 20C, 20D) interact with the virtual universe 12 through a communication network 22 via a virtual universe client 24 (e.g., 24A, 24B, 24C, 24D) that resides in the computer. Below are further details of the virtual universe 12, server array 14, and virtual universe client 24.

Figure 2:
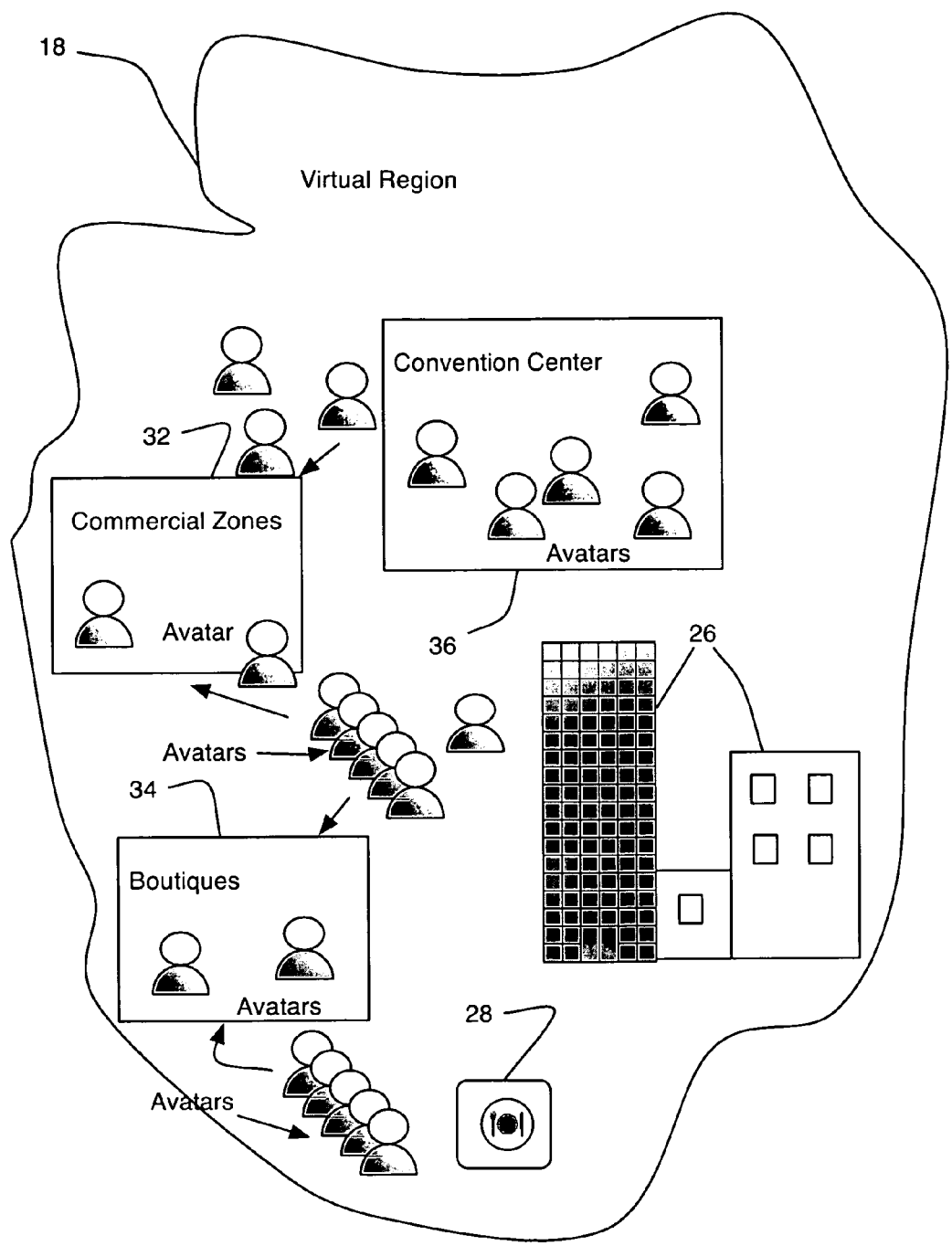
FIG. 2 depicts a more detailed view of a virtual region shown in the virtual universe of FIG. 1 in accordance with an embodiment of the present invention.

FIG. 2 shows a more detailed view of a virtual region shown 18 in the virtual universe 12 of FIG. 1 with avatars concentrated in various locations of the virtual region. As an example, the virtual region 18 shown in FIG. 2 comprises a downtown office center 26, restaurant 28, commercial zones 32 and boutiques 34 for shopping and a convention center 36 for meetings and various conventions. These examples of items in the virtual region 18 shown in FIG. 2 are only illustrative of some things that may be found in a virtual region 18 and those skilled in the art will recognize that these regions can have many more items that can be found in a real-life universe as well as things that do not presently exist in real life.

Residents or avatars which as mentioned above are personas or representations of the users of the virtual universe, roam all about the virtual region by walking, driving, flying or even by teleportation or transportation which is essentially moving through space from one point to another, more or less instantaneously. As shown in FIG. 2, there is a large concentration of avatars in or near the convention center 36, and there are a few avatars at the commercial zones 32 and at the boutique 34 and none at the downtown office center 26 and restaurants 28. Several avatars and/or a group of avatars are queued up to enter the commercial zone 32 and/or the boutiques 34. The avatars, or residents, of the virtual universe 12 can use their inventory 90 (FIG. 3) to store their belongings. The inventory 90 may function as a repository for virtually any item such as, but not limited to, avatar software, either decorative or functional, including mp3 players, encryption/decryption software, documents, virtual clothing, decorations, building architectures, artwork, and/or the like. Items may be exchanged directly between avatars, purchased or automatically deposited in an inventory 90. In any event, aspects of the invention provide a method of inventory governance in a virtual universe.

Figure 3:
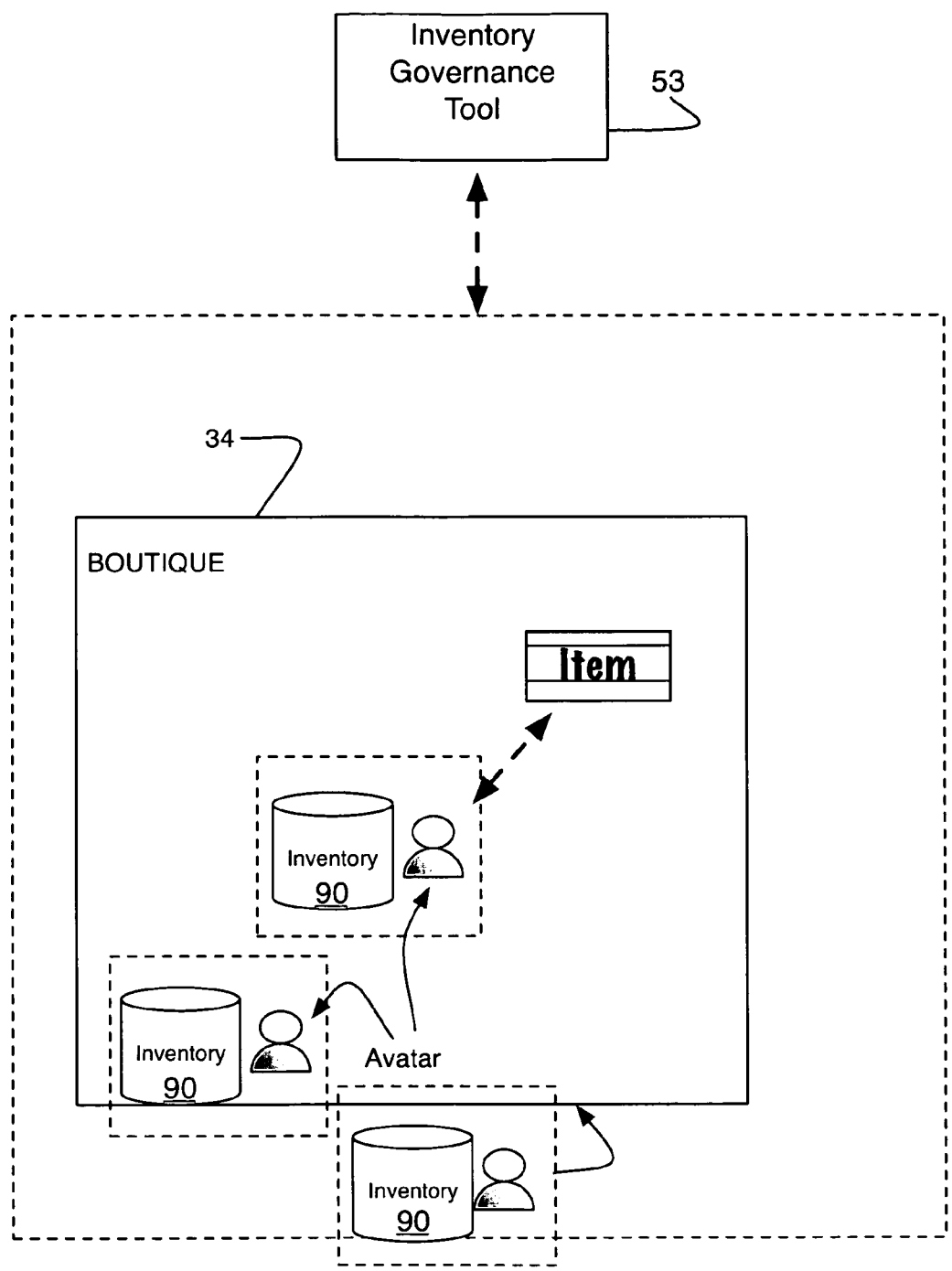
FIG. 3 depicts a more detailed view of a portion of the virtual region shown in FIG. 2 with a governing of an inventory in accordance with an embodiment of the present invention.

As more specifically shown in FIG. 3, an avatar, or group of avatars, each having a respective inventory 90, may traverse, for example, the boutique 34, examine items and make a purchase, thereby causing the purchased item(s) to be transferred into the avatar resident's inventory 90. One or more entity may wish to govern (e.g., limit, control, edit, check, verify, prevent, nullify, etc.) the transfer of the item(s) to the inventory 90 of the particular avatar. The entity may include, for example, a parent, another human, a group, another avatar, a group of avatars, the entity whence the item came from, and/or the like. As discussed herein, there are a near infinite variety of ways for an inventory governance tool 53 to govern an inventory 90 under aspects of the present invention.

Figure 4:
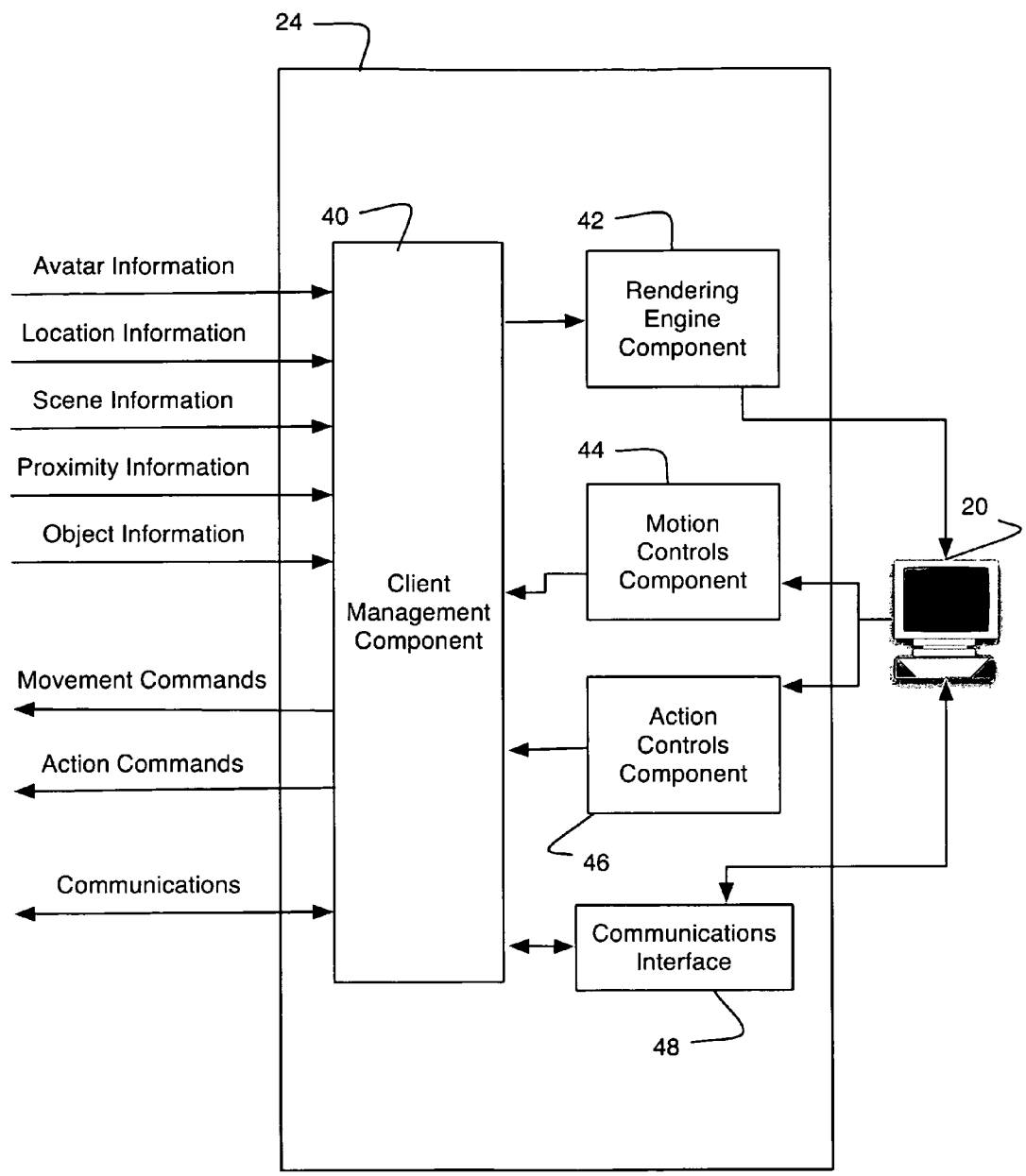
FIG. 4 depicts a more detailed view of the virtual universe client shown in FIG. 1 in accordance with an embodiment of the present invention.

FIG. 4 shows a more detailed view of the virtual universe client 24 shown in FIG. 1. The virtual universe client 24, which enables users to interact with the virtual universe 12, comprises a client management component 40, which manages actions, movements and communications made by a user through computer 20, and information received from the virtual universe through the server array 14. A rendering engine component 42 enables the user of the computer 20 to visualize his or her avatar within the surroundings of the particular region of the virtual universe 12 that it is presently located. A motion controls component 44 enables the user to make movements through the virtual universe. In one embodiment, movements through the virtual universe can include for example, gestures, postures, walking, running, driving, flying, etc.

An action controls component 46 enables the user to perform actions in the virtual universe such as buying items for his or her avatar or even for their real-life selves, building homes, planting gardens, etc., as well as changing the appearance of their avatar. These actions are only illustrative of some possible actions that a user can perform in the virtual universe and are not limiting of the many possible actions that can be performed. A communications interface 48 enables a user to communicate with other users of the virtual universe 12 through modalities such as chatting, instant messaging, gesturing, talking and email.

FIG. 4 shows various information that may be received by the client management component 40 from the virtual universe through the server array 14. In particular, the client management component 40 receives avatar information about the avatars that are in proximity to the user's avatar. In addition, the client management component 40 receives location information about the area that the user's avatar is near (e.g., what region or island he or she is in) as well as scene information (e.g., what the avatar sees). The client management component 40 also receives proximity information which contains information on what the user's avatar is near and object information which is information that can be obtained by one's senses (e.g., touch, taste, smell, etc.,) and what actions are possible for nearby objects (e.g., postures, movements). FIG. 4 also shows the movement commands and action commands that are generated by the user that are sent to the server array via the client management component 40, as well as the communications that can be sent to the users of other avatars within the virtual universe.

Figure 5:
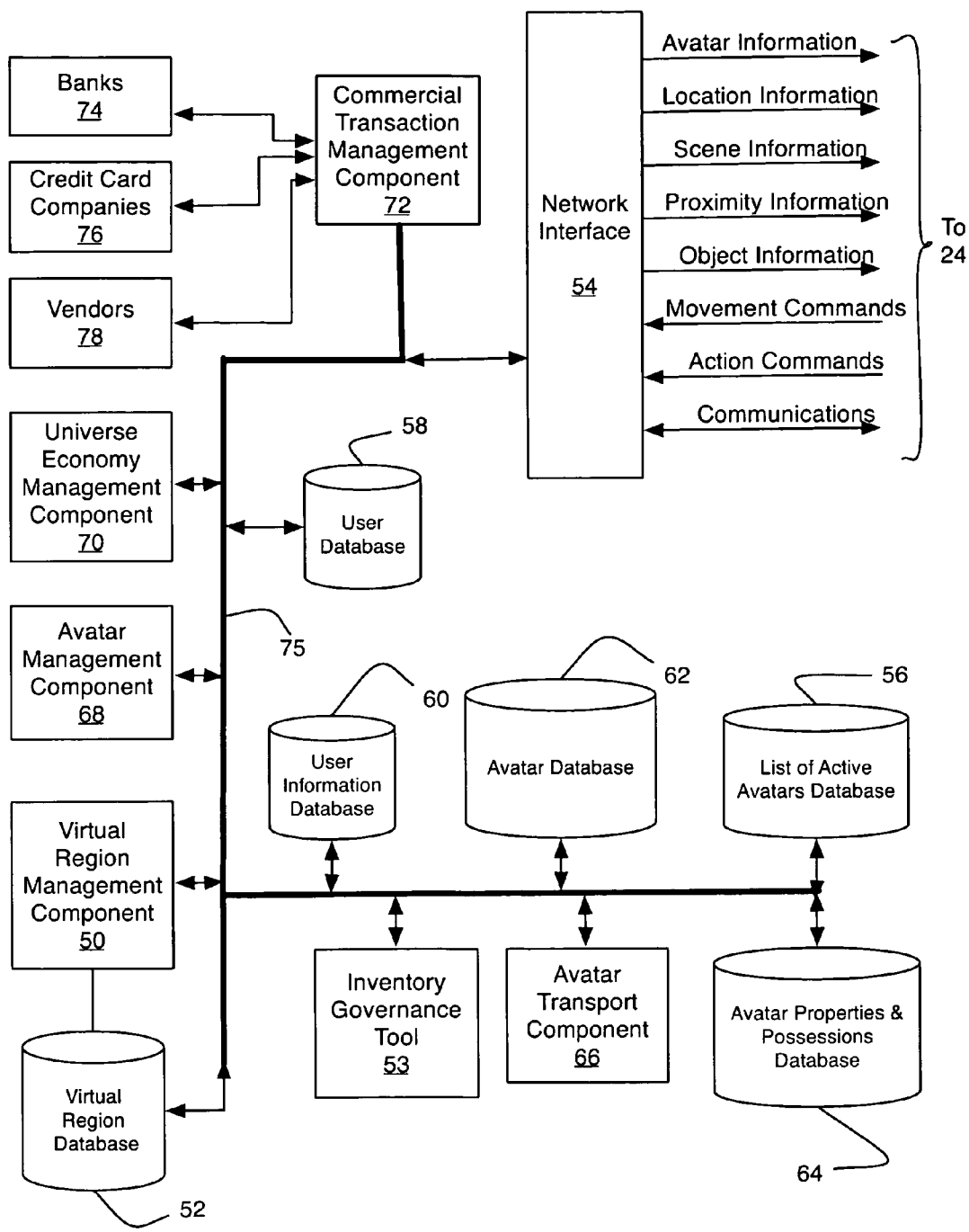
FIG. 5 depicts a more detailed view of some of the functionalities provided by the server array shown in FIG. 1 in accordance with an embodiment of the present invention.

FIG. 5 shows a more detailed view of some of the functionalities provided by the server array 14 shown in FIG. 1. In particular, FIG. 5 shows a virtual region management component 50 that manages a virtual region within the virtual universe. In particular, the virtual region management component 50 manages what happens in a particular region such as the type of landscape in that region, the amount of homes, commercial zones, boutiques, bridges, highways, streets, parks, restaurants, etc. A virtual region database 52 stores information on all of the items in the virtual region 18 that the virtual region management component 50 is managing. In one embodiment, for very large virtual universes, one server 16 may be responsible for managing one particular virtual region 18 within the universe. In other embodiments, it is possible that one server 16 may be responsible for handling one particular island within the virtual region 18.

An inventory governance tool 53 provides inventory governance in a virtual universe. Below is a more detailed discussion of the inventory governance tool 53 and how it provides inventory governance in a virtual universe, including a discussion on how the tool 53 provides an inventory 90 for a virtual universe resident; and provides a controlling means for controlling an aspect of an inventory 90 in a virtual universe.

FIG. 5 shows a network interface 54 that enables the server array 14 to interact with the virtual universe client 24 residing on computer 20. In particular, the network interface 54 communicates information that includes information pertaining to avatars, location, trajectory, scene, proximity and objects to the user through the virtual universe client 24 and receives movement and action commands as well as communications from the user via the universe client.

As shown in FIG. 5, there are several different databases for storing information. In particular, database 56 contains a list of all the avatars that are on-line in the virtual universe 12. Databases 58 and 60 contain information on the actual human users of the virtual universe 12. In one embodiment, database 58 contains general information on the users such as names, addresses, interests, ages, etc., while database 60 contains more private information on the users such as email addresses, billing information (e.g., credit card information) for taking part in transactions. Databases 62 and 64 contain information on the avatars of the users that reside in the virtual universe 12. In one embodiment, database 62 contains information such as all of the avatars that a user may have, the profile of each avatar, avatar characteristics (e.g., appearance, voice and movement features), while database 64 contains an inventory listing properties and possessions that each avatar owns such as houses, cars, sporting equipment, appearance, attire, etc. Those skilled in the art will recognize that databases 58-64 may contain additional information if desired. Although the above information is shown in FIG. 5 as being stored in databases, those skilled in the art will recognize that other means of storing information can be utilized.

An avatar transport component 66 enables individual avatars to transport, which as mentioned above, allows avatars to transport through space from one point to another point, instantaneously. For example, avatars could teleport to an art exhibit held in a museum held in Greenland.

An avatar management component 68 keeps track of what on-line avatars are doing while in the virtual universe. For example, the avatar management component 68 can track where the avatar presently is in the virtual universe, what activities it is performing or has recently performed. An illustrative but non-exhaustive list of activities can include shopping, eating, talking, recreating, etc.

Because a typical virtual universe has a vibrant economy, the server array 14 has functionalities that are configured to manage the economy. In particular, a universe economy management component 70 manages transactions that occur within the virtual universe between avatars. In one embodiment, the virtual universe 12 will have their own currency that users pay for with real-life money. The users can then take part in commercial transactions for their avatars through the universe economy management component 70. In some instances, the user may want to take part in a commercial transaction that benefits him or her and not their avatar. In this case, a commercial transaction management component 72 allows the user to participate in the transaction. For example, while walking around a commercial zone, an avatar may see a pair of shoes that he or she would like for themselves and not their avatar. In order to fulfill this type of transaction and others similarly related, the commercial transaction management component 72 interacts with banks 74, credit card companies 76 and vendors 78 to facilitate such a transaction.

The components in FIG. 5 are all interconnected via an interconnect 75. Although shown in FIG. 5 as connected via interconnect 75, all of the components may be configured to interact with each other using other means now known or later developed. The components that are shown as being interconnected via interconnect 75 are illustrated in that manner to convey the close interactions that exist between these components such as the banks 74, credit card companies 76, and vendors with the commercial transaction management component 72.

Figure 6:
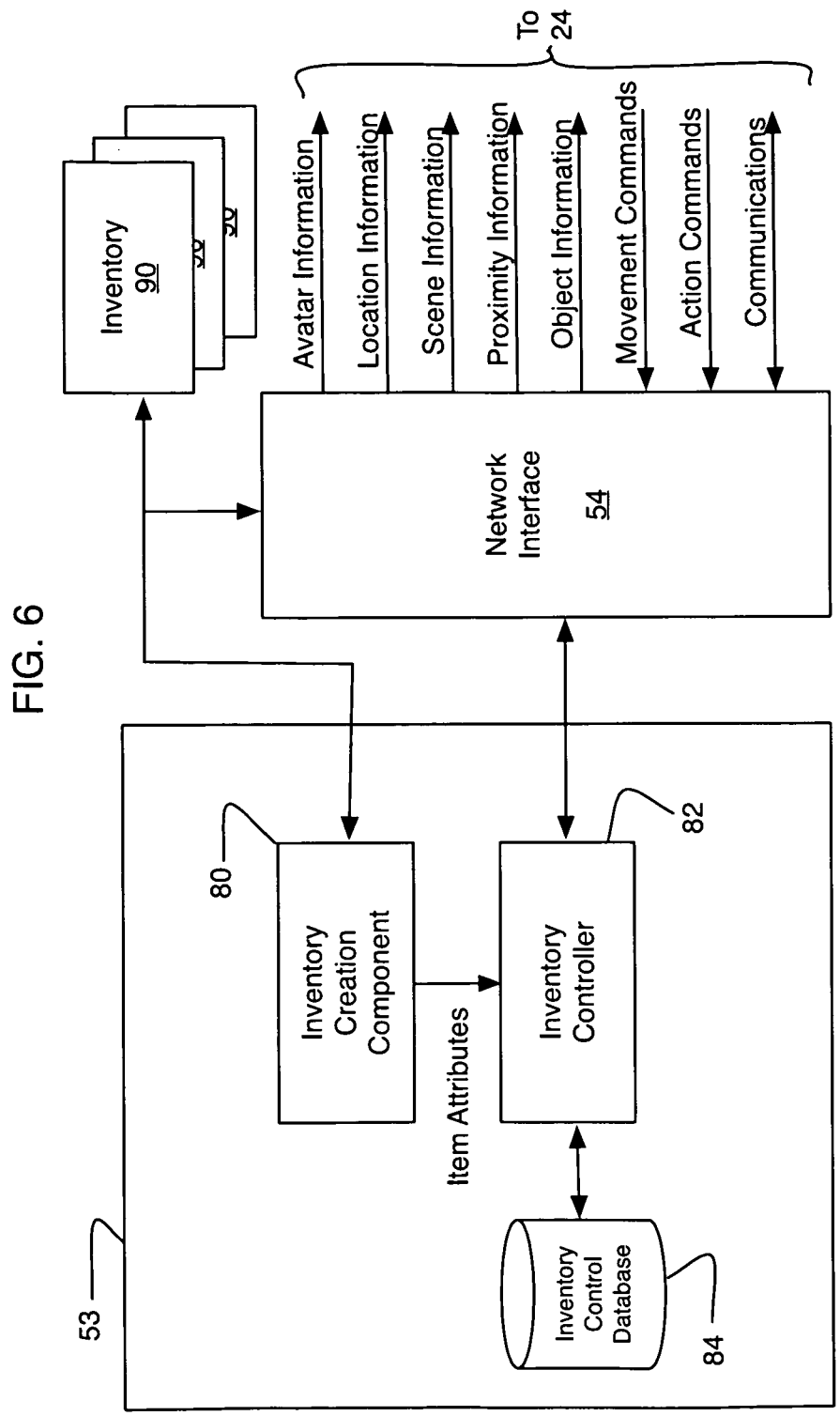
FIG. 6 depicts a more detailed view of an inventory governance tool in FIG. 5 in accordance with an embodiment of the present invention.

FIG. 6 shows a more detailed view of an inventory governance tool 53 shown in FIG. 5 according to one embodiment of the invention. As mentioned above, the user inventory governance tool 53 provides inventory governance in a virtual universe. As shown in FIG. 6, in one embodiment, the inventory governance tool 53 resides on a computer system that is a part of the server array 14 and communicates directly to the virtual universe and its residents via the virtual universe client 24. In other embodiments, the inventory governance tool 53 might reside on separate computers in direct communication with the virtual universe servers 16 and universe clients 24.

The inventory governance tool 53 comprises an inventory creation component 80, an inventory controller 82, and a inventory control database 84. The inventory creation component 80 comprises a means for providing an inventory for a virtual universe resident. The inventory controller 82 provides a controlling means for controlling an aspect of the inventory in a virtual universe.

Aspects of the invention include an inventory controlling means for a virtual universe 12 (e.g., inventory controller 82) that provide methods to allow authorized parties to impose mechanisms to control the inventories belong to members under their authority. Authorized parties may comprise the resident's parents or guardians (e.g., if resident is a minor), entities such as government entity, an employer, a financial institution, etc.

The control system, which may control a plurality of filters and an inventory management system, may be activated and established in a plurality of ways, under aspects of the present invention. For example, the control system may be established by any of a group consisting of: a virtual universe simulation engine software, an avatar, a trusted third party, an encrypted token carried with the avatar resident, by the item itself. The avatar and/or user could impose restrictions on him/herself, such as placing a quantity on the maximum number of items allowed in the inventory 90. The trusted third party could receive virtual universe simulation software so as to check if an item has been added to the inventory 90. The trusted third party, which may be voluntary or not, could comprise a child, an employee, an employer, a governmental agency, a parent, and/or the like. With the encrypted token embodiment, the avatar member could carry the encrypted token with him/herself in the virtual universe 12. In this manner, when a member enters a new virtual universe 12 and/or virtual region 18, he/she presents the token with its concomitant filter rules and the virtual universe 12 and/or virtual region 18 uses it to authorize the transaction (e.g., purchase of an item, placement of item in inventory 90, etc.). In an alternative embodiment, the item itself can carry properties that prevent the item from being owned by unauthorized persons.

In an embodiment filters and/or restrictions may be instituted at a group level. An entity (e.g., individual, corporation, government agency, etc.) could establish a group relationship wherein at least one or more authorized individuals may be designated as entities with inventory governance authority. The following Table 1 discloses exemplary authorization groups:

TABLE 1

| Group | Authorized Entities | Members |
|---|---|---|
| Family | Mother and Father | Children |
| Corporation | CEO, CFO | Employees |
| Government | FBI, Police | Citizens |

In this manner authorized entities can set filters and/or restrictions to each member's inventory 90. The authorized entities can impose filters and/or restrictions at a group level that members must abide to, at an individual level or according to roles of the group. For example, per Table 1 (above) a mother and father may govern the inventory 90 of any children in the family group. Similarly, the CEO and CFO of a corporation may govern the inventories 90 of all employees of their corporation.

In a typical scenario an avatar member would like to add an item to his inventory 90. The adding may be via a purchase, rental arrangement, borrowing, or any process that may result in the item being associated with his inventory 90. Attributes of the item are processed through the filter and decision points. If the item does not pass the filtering and/or decision points, the item is not added to the inventory 90; the item is added to the inventory 90 in a "disabled" mode; and/or the item the added to the inventory 90 after a manual exception approval process (e.g., override). In the disabled mode, the member may, for example, be given an option to enable the item to be added to the inventory 90 at a later time when aspects of the inventory 90 pass any applicable filters.

An inventory 90 filter may be created in a plurality of ways. For example, an authorizing entity selects a group that he/she has authority over and then selects a "set filter" option. In another embodiment the authorizing entity creates a filter by, for example, entering a filter condition, an expiration date, a manual approval option, and/or the like. In still another embodiment the authorizing entity views and selects a list of group members to be associated with the applicable filter.

Filters can similarly be implemented in a plurality of ways. In an embodiment a filter may be implemented by the use of a semantic tag to specify the characteristics of an item. The semantic tag could be assigned by a creator of an object, a manufacturer, and/or a third party. For example, a rating service may associate tags with an item, such as "maturity level". Similarly, the use of social tagging can be applied to items. For example, when a teenage gets an account, the parent may want to block items with social tags of "mature" or "violent". While such tags may not always be accurate, if more than one tag is applied, tags with a greater frequency of occurrence may be counted more than tags with lesser frequency of occurrence. Additionally, through a set of programming operations that utilize, for example, if-then conditional clauses on object such as "Member Inventory", Inventory Item" and "Member" or on a combination thereof. A filter could also be set by setting a password that must be used before adding items of a particular type.

In some embodiments, tags may be contested because either the potential member or manufacturer does not agree that the tag is accurate. The system may provide a means for adjudicating the validity of the contested tags. For example, the resident could "right click" on a tagged item to inform a service that the tag does not appear to be accurate. The service then examines the resident's reasoning and renders a decision regarding the validity of the tag, and, if necessary, change the tag.

Examples of scenarios employing aspects of the invention include a child is prevented from filling their inventory with more than $20 worth of items. Another scenario may be a child cannot fill their inventory with, for example, mature, violent, and/or controversial material. The control parameters may be set by a parent, state, country, police, employer, spouse, intelligent agent, and/or the shopper him/herself. In still another scenario an item may be allowed to be added to the inventory, but cannot be used by the virtual universe resident without approval.

In another embodiment a disabled mode is employed. In this manner, if an item is added to a member's inventory in a disabled mode, the item can be enabled manually (e.g., override) or automatically if certain conditions of the inventory pass the filters. For example, a filter is set to limit the totally quantity of items residing in the inventory to be 500. Once the member removes unused items to keep the number lower than the maximum (e.g., 500), the member will be allowed to enable the disabled items.

In another embodiment of the present invention a monitoring, or tracing, function of inventory use and rules management is provided. By providing a tracing function, the invention enables the use of a management console for monitoring inventory transactions. For example, parents could see that a child attempted to add unauthorized items into his/her inventory. The management console could be used by authorized entities for adding, deleting, and/or modifying filters of individuals and/or groups. Additionally, a mirroring option may be employed that enables the ability of items in the monitored inventories to be mirrored simultaneously into an authorized entities' inventory. For example, the items in the inventory of Child A will appear as a subfolder, for example "Inventory of Child A" in the mother's inventory.

Figure 7A:
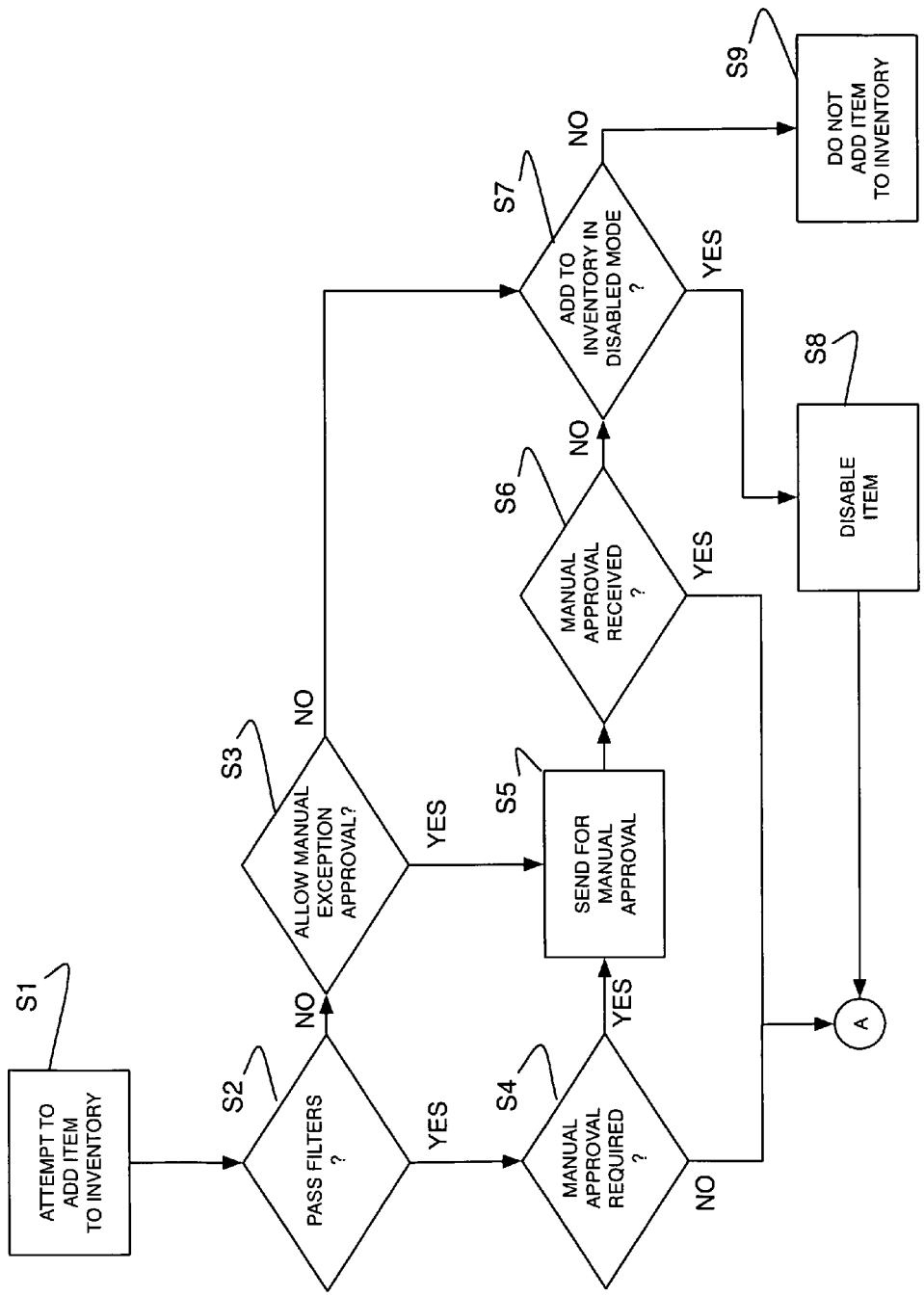
FIG. 7A depicts a first portion of a method of inventory governance in a virtual universe in accordance with an embodiment of the present invention.

FIGS. 7A and 7B depict a process flow for providing inventory governance in a virtual world according to an embodiment of the present invention. The process starts on FIG. 7A at S1, wherein an attempt is made by an avatar to add at least one item to his/her inventory 90. At S2, the item is compared to any filter(s) that may have been created to confirm that the item has passed the filter(s). If the item has not passed the filter (i.e., S2 is "NO"), then at S3 the method checks if a manual exception approval is allowed. If a manual exception approval is not allowed (i.e., S3 is "NO"), then at S7 the process confirms if the item may be added to the inventory in a disabled mode. If the item may not be added to the inventory in disabled mode (i.e., S7 is "NO"), then at S9 the process finishes wherein the item is not added to the inventory.

Returning to S3, a manual exception approval is allowed (i.e., S3 is "YES"), then at S5 the process sends for manual approval. At S6 the system checks if manual approval is received. If the manual approval is not received (i.e., S6 is "NO"), then at S7 the process confirms if the item may be added to the inventory in a disabled mode. As above, if the item may not be added to the inventory in disabled mode (i.e., S7 is "NO"), the at S9 the process finishes wherein the item is not added to the inventory. Contrastingly, if at S7, the item may be added to the inventory in a disabled mode (i.e., S7 is "YES"), then at S8 the item is added to the inventory in a disabled mode. After S8, the method continues to FIG. 7B via continuation connector "A".

Returning to S6 (i.e., confirming whether manual approval is received), if manual approval is received (i.e., S6 is "YES"), then the method continues to FIG. 7B via continuation connector "A".

Returning to S2, if the item does pass the filter (i.e., S2 is "YES"), then at S4 the method verifies if manual approval is further required to add the item to the inventory. If manual approval is also required (i.e., S4 is "YES"), then the method proceeds to S5 and sends for manual approval. After S5, the method proceeds as discussed above. Contrastingly, if manual approval is not required (i.e., S4 is "NO"), then the method continues to FIG. 7B via continuation connector "A".

Referring to FIG. 7B connector A continues to S10 wherein the system confirms whether or not tracing is on. If tracing is on (i.e., S10 is "YES"), then at S11 a transaction trace is created. Then at S11 the trace is input into a management monitoring console. Contrastingly, if tracing is off (i.e., S10 is "NO"), then at S13 the system confirms if object mirroring is on. Similarly, after S11, the process also proceeds to S13. In any event, if object mirroring is on (i.e., S13 is "YES") then at S14 a mirror created prior to S15. Contrastingly, if object mirroring is off (i.e., S13 is "NO"), then the process proceeds directly (i.e., no intermittent mirror creation at S14) to S15 where the item is added to the inventory.

In another embodiment illustrated herein is the use of pseudocode to provide a method of inventory governance. The pseudocode include Member, Inventory, and Inventory Item components and their associated attributes. Different preset filters can be created at the Group, Inventory Object, Member and/or Inventory level. The master filter could be built by combining Group filter+Member Filter+Inventory filter+Item filter. Rules may determine which filter supersedes in case of a conflict (e.g., Member tries to override Group filters).

The relationship between Members, Inventories and Items may be many-to-many for a given transaction. For example, you may have multiple customers that can access the same inventory; one customer with multiple inventories; or, an attempt to add multiple Items at one time. The filters could be process for each Member, Inventory or Item in a multiple transaction.

Examples of filters pseudocode could be as follows:
Group (Underage Minor) Filters
If item.text_search( )==inappropriate; fail//search all text in the Item attributes
If item.min_age_required<member_age; fail
If item.tag_rating=={G||PG||PG13}; pass
Group (Strict Government) Filters
If item.social_tags contains ("spy"||"espionage"); fail
If item.government_tags.contains "illegal"; fail
If item.text_search( ) contains "treason"; fail
Member Filters
If item.price>$100; fail
If inventory.total_purchases_for month>$500; fail
If item.color==purple; fail
Inventory Filter
If item.size+storage_used>storage_allowed; fail
Inventory Object Filter//filter can be dictated by the object too
If (Member.group==minor) and (rating==R); fail
If (member.age<18; fail//Object says, "Don't sell me to children"
Examples of objects pseudocode could be as follows:
Inventory Item
string name
int price
int size
string color
int min_age_required
enum tag_rating {G, PG, PG12, R, X} public array [string] social_tags//can be set by anyone in the VU private array [string] creator tags//set by the creator of the object protected array [string] government_tags//can only be set by a certain group Member Groups (Minor, Strict_Government, Female, Duke_student)

Int age

Int credit rating

Int max spending/day

Mirror conditions (if object_type==X, create mirror in account_name==Mom)

Member Inventory

Int max_num_items_allowed

Int num_items

Int storage_used

Int storage_allowed

Various possible implementations are illustrated herein. For example, in a first scenario, parents may impose a spending limit on a their child's inventory value. The parents of a minor child may set up rules to limit spending on his/her inventory up to a certain amount. The inventory may be equipped with a feature to count the total value of all items in it. Prior to completion of any purchase that the child makes, an additional step of checking the child's inventory limit will be done to ensure that the new purchase does not exceed the child's allowed inventory limit. If the minor attempts to make a purchase that exceeds the allowed limit, the child would need to ask his/her parents for permission to increase the inventory value if the wants to make additional purchases.

In a second scenario, the government may impose rules to, for example, prevent children from purchasing material with violent or mature content, or other items with age restrictions. In a virtual universe, the members can come from different countries in real life. Prior to any purchase of items that has an age restriction, each member has to provide his identity and country of residency. The ensuing purchase process will check the member's country of residency and impose the rules against the purchase if it is illegal. A variation of this scenario can be the following: each member is allowed to purchase the items he/she would like to have. However, if the member is a minor, the government dictates that he/she need to first gain approval from his/her parents or guardian upon using any items that have an age restriction. For example an automatic notification will be sent to the minor's parents if he/she would like to watch a movie with violent content.

In a third scenario, a financial institution may impose spending limits on residents. For example, if a member has a bad credit history or low credit score, his/her financial institution can impose a limit on the inventory so that the member cannot make any purchase unless he/she pays off some of the balance with that financial institution.

In a fourth scenario, groups may impose group spending limits on the members' inventories. For example, a database could be established to store the relationship of any residents in real life. Residents who are relates such as friends, family, a club, or coworkers in an organization can establish a group spending limit on the total summer of its members' inventories. This group inventory limit can be set to be permanently or based on a particular time window (e.g., $1,000 per group per month).

In a fifth scenario, the virtual universe management may impose a limit on inventory capacity. Many members of a virtual universe have inventories containing thousands of items. As the quantity of items grows larger for each member, it can create a potential management challenged for the virtual universe management team. Hence the virtual universe management team may impose a limit on the inventory capacity to limit the number of items possessed by the residents. For example, each resident can only have at most 20 items in his/her inventory. If his/her inventory reaches the maximum amount, he/she is forced to dispose, give away, destroy, or auction his/her oldest possessed items when he/she would like to add a new item to his/her inventory.

In a sixth scenario parents may monitor and control their child's inventory by requesting a trace on their child's inventory. Thus, whenever the child adds an item to his inventory, it will automatically notify the parents or it automatically creates a mirror image in the parents' inventory. The parent can review the list of mirror images and delete the inappropriate items. The deleted items in the child's inventory that correspond to the delete mirror images of the parents' inventory will be synchronized and deleted. Similarly, the parents can also purchase items for the child such as educational materials, movies, and/or music for the child that are appropriate. The parents may then designate the purchases items to be added to the child's inventory, and a mirror image will remain in the parents' inventory.

In a seventh scenario, a virtual universe merchant can create a limit of promotional products per customer, or customer group. For example, each customer can only purchase one pair of the new sneakers and they are not transferable. In another example, the merchant can allow one promotional item per each family and allow the sharing of the item if the family pays a "time-sharing" fee to enable the time-sharing feature of the item. The merchant can also sell the promotional item to the customer allowing it to only be used within a restricted time window.

In another embodiment of the invention, the inventory governance tool 53 is used as a service to charge fees for each user, or group of users, that have an aspect of their inventory governed. In this embodiment, the provider of the virtual universe or a third party service provider could offer this inventory governance tool 53 as a service by performing the functionalities described herein on a subscription and/or fee basis. In this case, the provider of the virtual universe or the third party service provider can create, deploy, maintain, support, etc., the inventory governance tool 53 that performs the processes described in the disclosure. In return, the virtual universe or the third party service provider can receive payment from the virtual universe residents via the universe economy management component 70 and the commercial transaction management component 72.

In still another embodiment, the methodologies disclosed herein can be used within a computer system to provide inventory governance in a virtual universe. In this case, the inventory governance tool 53 can be provided and one or more systems for performing the processes described in the disclosure can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the disclosure.

Figure 8:
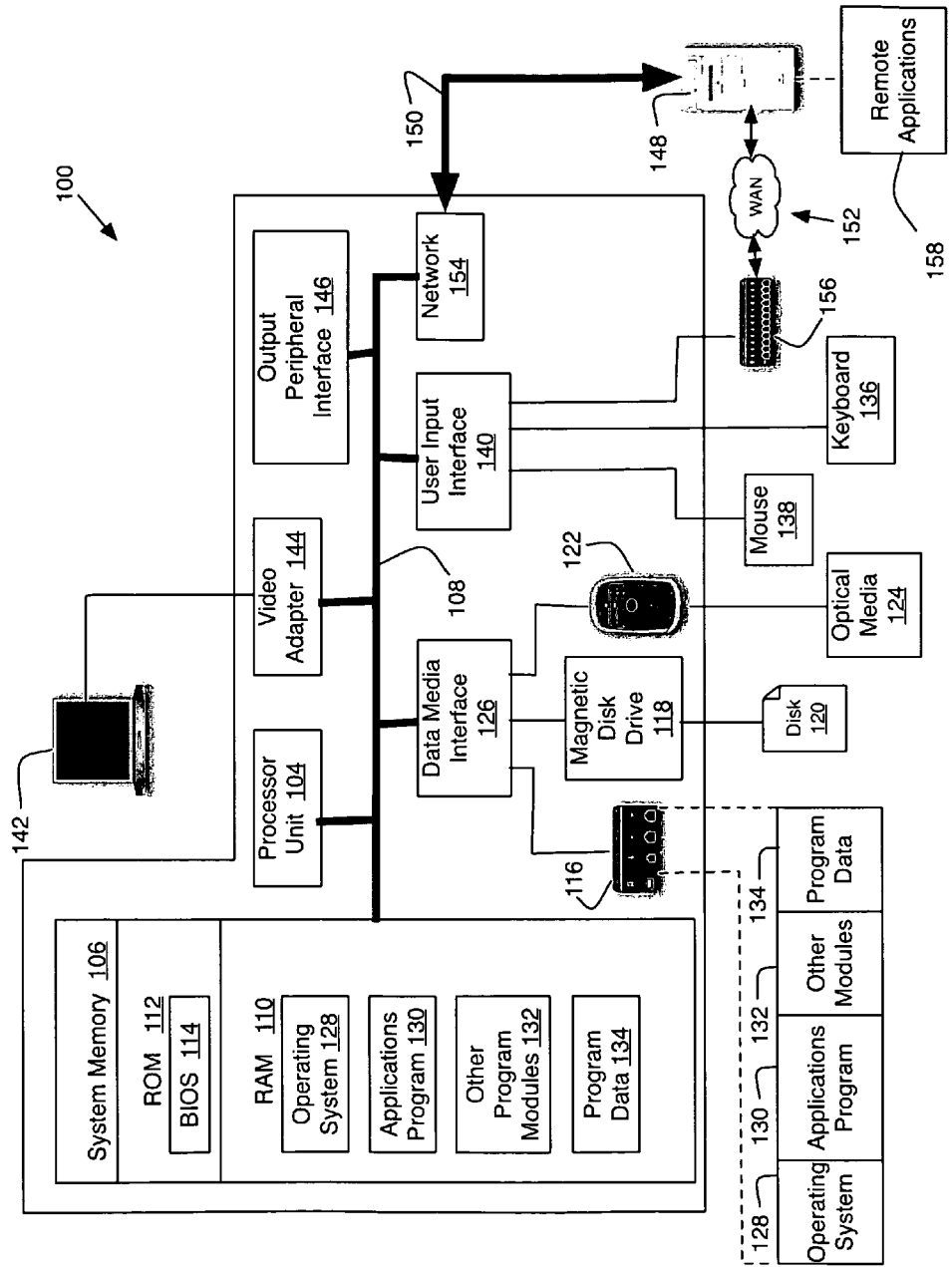
FIG. 8 depicts an illustrative computer system for implementing embodiment(s) of the present invention.

FIG. 8 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the approach described herein. Neither should the computing environment 100 be interpreted as having any dependency or requirement relating to any one or combination of components illustrated in FIG. 8.

In the computing environment 100 there is a computer 102 which is operational with numerous other general purpose or special purpose computing system environments or configurations. Examples of well known computing systems, environments, and/or configurations that may be suitable for use with an exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on, that performs particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 8, the computer 102 in the computing environment 100 is shown in the form of a general-purpose computing device. The components of computer 102 may include, but are not limited to, one or more processors or processing units 104, a system memory 106, and a bus 108 that couples various system components including the system memory 106 to the processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 102 typically includes a variety of computer readable media. Such media may be any available media that is accessible by computer 102, and it includes both volatile and non-volatile media, removable and non-removable media.

In FIG. 8, the system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 9 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs a hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130, other program modules 132, and program data 134 or some combination thereof, may include an implementation of the networking environment 10 of FIG. 1 including the server array 14, the virtual universe client 24 and the inventory governance tool 53. In an embodiment, the application programs 130 can comprise, for example, an application for providing an inventory for a VU resident, an application for governing at least one aspect of the inventory, wherein the application for governing includes at least one of an administrative interface application for establishing an authorizing relationship between the VU resident and an authorizing entity, a filtering interface application for administering at least one filter to the inventory, or a monitoring interface application for providing capability to monitor at least one of: the VU resident or the inventory.

A user may enter commands and information into computer 102 through optional input devices such as a keyboard 136 and a pointing device 138 (such as a "mouse"). Other input devices (not shown) may include a microphone, joystick, game pad, satellite dish, serial port, scanner, camera, or the like. These and other input devices are connected to the processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 8 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to the system bus 108 via the user input interface 140 or other appropriate mechanism.

In a networked environment, program modules depicted relative to the personal computer 102, or portions thereof, may be stored in a remote memory storage device. By way of example, and not limitation, FIG. 8 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this disclosure an approach for providing inventory governance in a virtual universe. While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A computer-implemented method of inventory governance in a virtual universe (VU) performed on at least one computing device, the method comprising:
   providing an inventory for a virtual universe (VU) resident on the at least one computing device; and
   governing at least one aspect of the inventory, the governing including:
      establishing an authorizing relationship between the VU resident and an authorizing entity;
      in response to a request to add an item to the inventory, administering a filter to the item,
      wherein the filter is dictated by the authorizing entity, wherein the filter is concomitant with an encrypted token, and the encrypted token remains associated with the VU resident as the VU resident travels within the VU,
      the filter determining whether the item is to be added to the inventory,
      wherein the authorizing entity is distinct from the VU resident and a user of the VU resident; and
      providing capability to the authorizing entity to monitor the inventory.

2. The method of claim 1, wherein the authorizing entity is at least one of: a human individual, a plurality of human individuals, a corporate entity, a governmental entity, or an intelligent agent, wherein each authorizing entity has unique filter criteria.

3. The method of claim 1, the administering including at least one of:
   adding the item to the inventory in the case that the item passes the filter;
   rejecting the item from the inventory in the case that the item does not pass the filter; or
   allowing for use of the item in the inventory.

4. The method of claim 1, the monitoring further including providing capability for the authorizing entity or a human individual to view and trace an inventory transaction of the VU resident synchronously or asynchronously.

5. The method of claim 1, wherein the administrative interface provides a capability for the authorizing entity to add, delete, or modify the item from the inventory of the VU resident when the VU resident attempts to one of:
   adding an unauthorized item to the inventory; or
   using an unauthorized item.

6. The method of claim 1, wherein the inventory filter is based on at least one of: a price of the item, an aspect of the item, a total quantity of the item, or a usage of the item.

7. The method of claim 1, wherein the encrypted token is carried by the VU resident as the VU resident travels within the virtual universe.

8. The method of claim 1, the governing further comprising a manual override approval capability for administering when the VU resident violates the filter.

9. The method of claim 1, wherein the governing operates based upon rules or heuristics.

10. The method of claim 9, wherein one of the rules and heuristics considers at least one of: an aspect of the VU, the VU resident, the authorizing entity, an item added to the inventory, or unauthorized usage of an inventory item.

11. The method of claim 9, wherein the rules are set by one of: an avatar, a human individual, a plurality of human individuals, a corporate entity, a governmental entity, or an intelligent agent.

12. A system comprising:
   at least one computing system for inventory governance in a virtual universe (VU), the at least one computing system having:
      an inventory for a virtual universe (VU) resident; and
      a system for governing at least one aspect of the inventory, the governing system comprising:
         an administrative interface for establishing an authorizing relationship between the VU resident and an authorizing entity;
         a filtering interface for administering a filter to the inventory in response to a request to add an item to the inventory,
         wherein the filter is dictated by the authorizing entity, wherein the filter is concomitant with an encrypted token, and the encrypted token remains associated with the VU resident as the VU resident travels within the VU, the filter determining whether the item is to be added to the inventory, wherein the authorizing entity is distinct from the VU resident and a user of the VU resident; and a monitoring interface for providing capability to the authorizing entity to monitor the inventory.

13. The system of claim 12, wherein the authorizing entity is at least one of: a human individual, a plurality of human individuals, a corporate entity, a governmental entity, or an intelligent agent, wherein each authorizing entity has unique filter criteria.

14. The system of claim 12, the filtering interface provides for at least one of:
adding the item to the inventory in the case that the item passes the filter;
rejecting the item from the inventory in the case that the item does not pass the filter; or
allowing for use of the item in the inventory.

15. The system of claim 12, wherein the administrative interface provides a capability for the authorizing entity to add, delete, or modify the item from the inventory of the VU resident when the VU resident attempts to one of:
add an unauthorized item to the inventory; or
use an unauthorized item.

16. The system of claim 12, wherein the governing system is configured to apply the filter to the item based on at least one of: a price of the item, an aspect of the item, a total quantity of the item, or a usage of the item.

17. The system of claim 12, wherein the encrypted token is carried by the VU resident as the VU resident travels within the virtual universe.

18. The system of claim 12, the governing system further comprising a manual override approval capability for administering when the VU resident violates the filter.

19. A program product stored on a computer readable medium, which when executed, provides inventory governance in a virtual universe (VU), the computer readable medium comprising program code for:
providing an inventory for a virtual universe (VU) resident; and
governing at least one aspect of the inventory, the governing including:
establishing an authorizing relationship between the VU resident and an authorizing entity;
in response to a request to add an item to the inventory, administering a filter to the item,
wherein the filter is dictated by the authorizing entity,
wherein the filter is concomitant with an encrypted token, and the encrypted token remains associated with the VU resident as the VU resident travels within the VU,
the filter determining whether the item is to be added to the inventory,
wherein the authorizing entity is distinct from the VU resident and a user of the VU resident; and
providing capability to the authorizing entity to monitor the inventory.

20. The program product of claim 19, wherein the authorizing entity is at least one of: a human individual, a plurality of human individuals, a corporate entity, a governmental entity, or an intelligent agent, wherein each authorizing entity has unique filter criteria.

21. The program product of claim 19, the administering including at least one of:
adding the item to the inventory in the case that the item passes the filter;
rejecting the item from the inventory in the case that the item does not pass the filter; or
allowing for use of the item in the inventory.

22. The program product of claim 19, the monitoring further including providing capability for the authorizing entity or a human individual to view and trace an inventory transaction of the VU resident synchronously or asynchronously.

23. The program product of claim 19, wherein the administrative interface provides a capability for the authorizing entity to add, delete, or modify the item from the inventory of the VU resident when the VU resident attempts to one of:
add an unauthorized item to the inventory; or
use an unauthorized item.

24. The program product of claim 19, wherein the inventory filter is based on at least one of: a price of the item, an aspect of the item, a total quantity of the item, or a usage of the item.

25. A method for deploying an application for providing inventory governance in a virtual universe (VU), comprising:
providing at least one computing device being operable to:
provide an inventory for a virtual universe (VU) resident on the at least one computing device; and
govern at least one aspect of the inventory, the governing comprising:
establishing an authorizing relationship between the VU resident and an authorizing entity;
in response to a request to add an item to the inventory, administering a filter to the item,
wherein the filter is dictated by the authorizing entity,
wherein the filter is concomitant with an encrypted token, and the encrypted token remains associated with the VU resident as the VU resident travels within the VU,
the filter determining whether the item is to be added to the inventory,
wherein the authorizing entity is distinct from the VU resident and a user of the VU resident; and
providing capability to the authorizing entity to monitor the inventory.

* * * * *